May 5, 1970    A. A. AKIN, JR., ET AL    3,510,192
TELESCOPE SIGHT
Filed Aug. 3, 1965    3 Sheets-Sheet 2
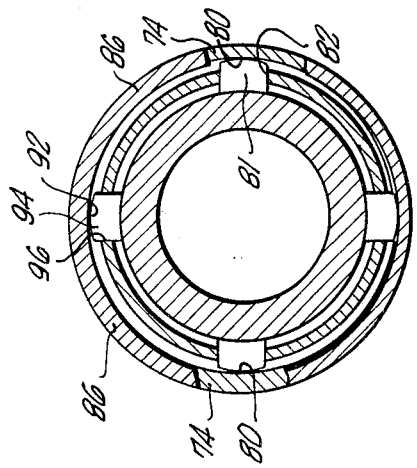
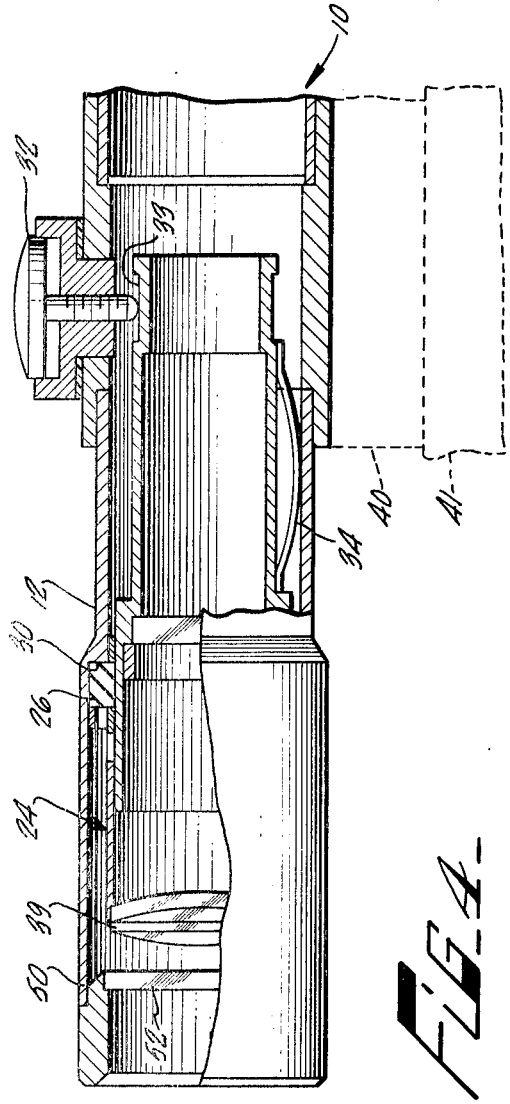
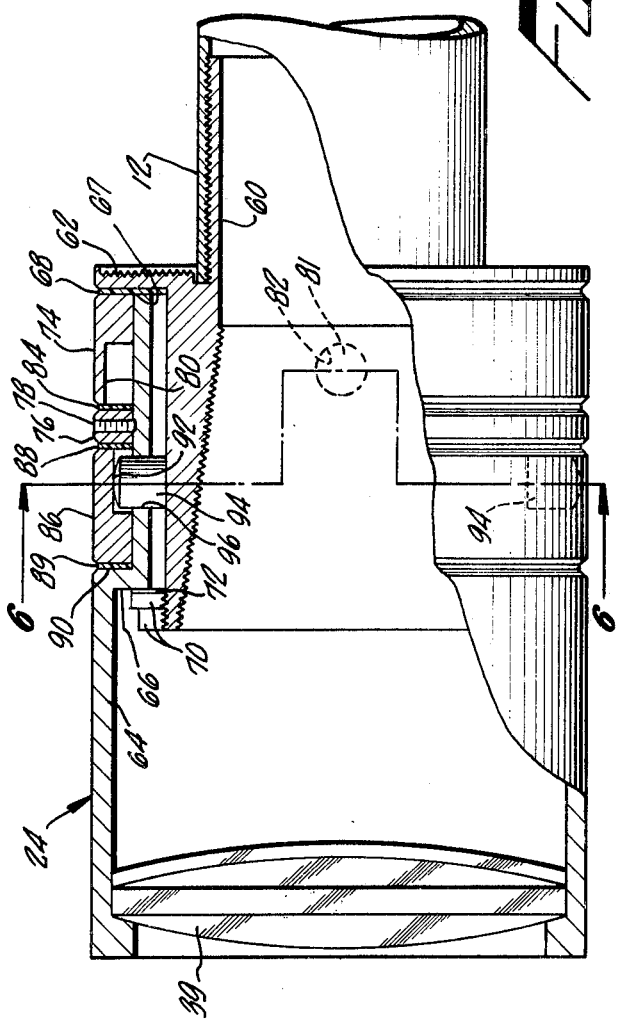
INVENTORS.
ALFRED A. AKIN, JR.
PAUL R. MAGUIRE
BY
Christie, Parker & Hale
ATTORNEYS.

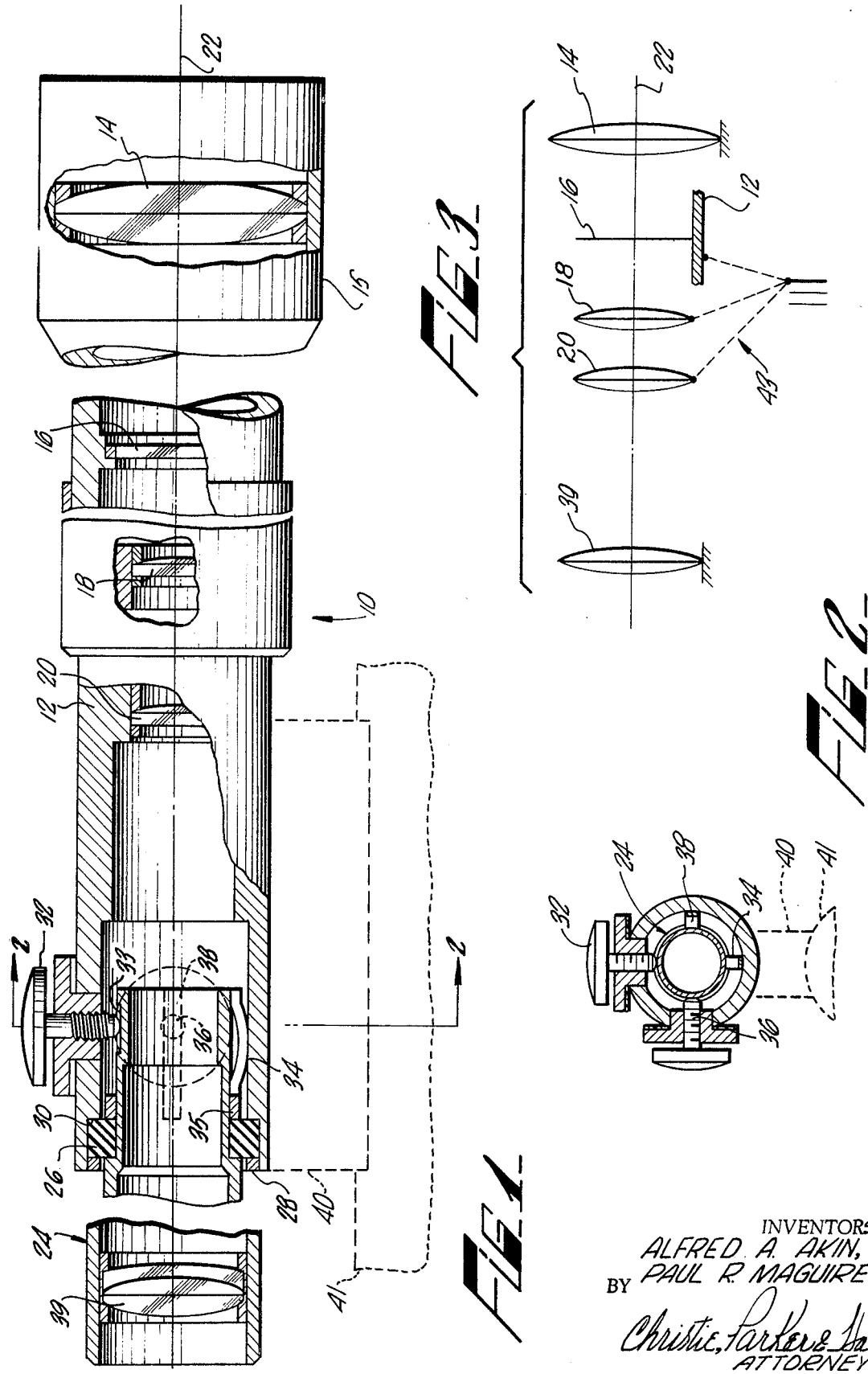

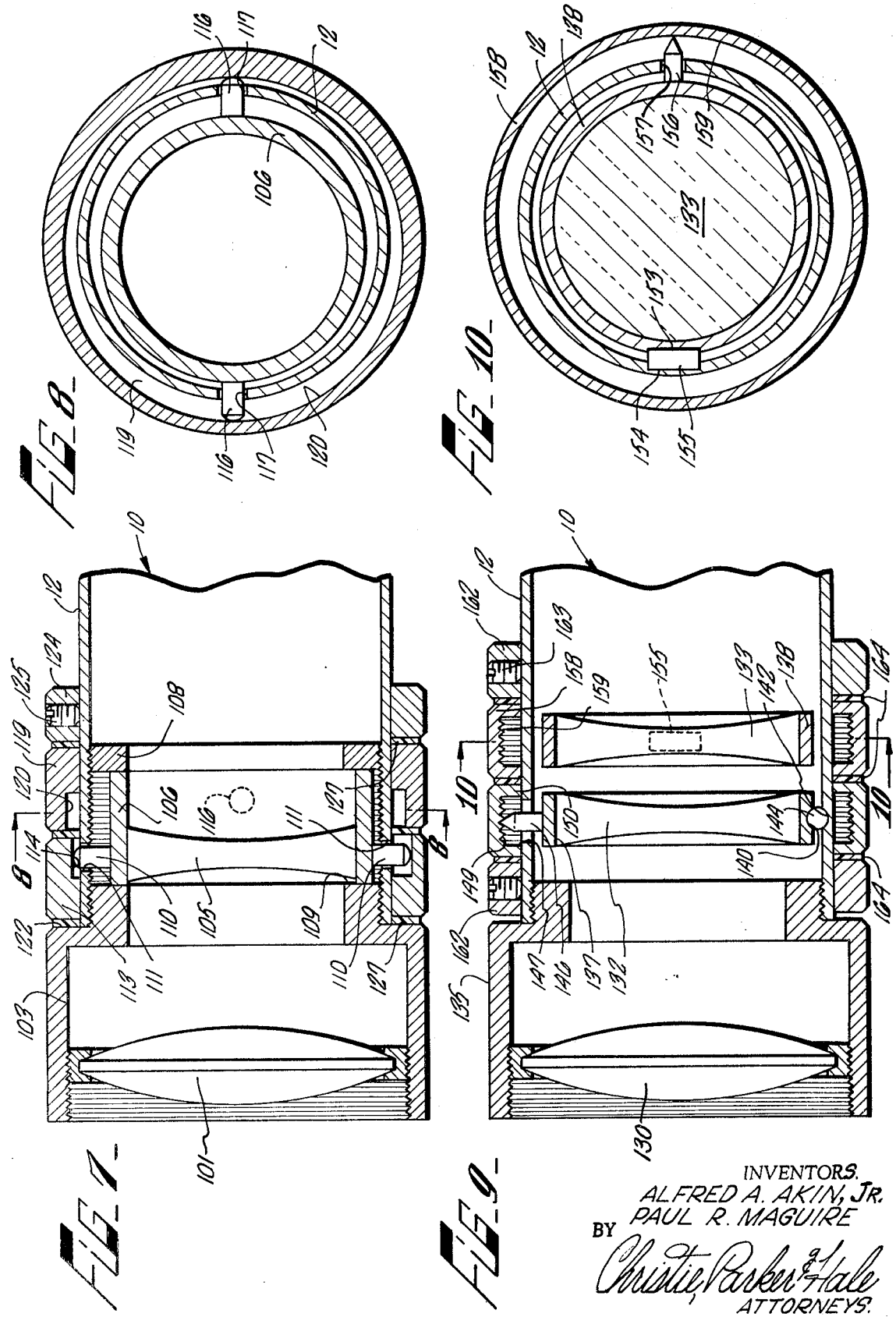

United States Patent Office 3,510,192
Patented May 5, 1970

3,510,192
TELESCOPE SIGHT
Alfred A. Akin, Jr., West Covina, and Paul R. Maguire, Los Angeles, Calif., assignors to David P. Bushnell
Continuation-in-part of application Ser. No. 335,728, Jan. 6, 1964. This application Aug. 3, 1965, Ser. No. 477,667
Int. Cl. G02b 27/32
U.S. Cl. 350—10                          2 Claims

ABSTRACT OF THE DISCLOSURE

A riflescope having an objective-lens system which is movably mounted with respect to a supporting barrel. Adjustment of the objective-lens position produces a target-image shift in the focal plane of the lens system and transverse to an optical axis of the riflescope. Windage and elevation corrections are thereby effected without displacing a reticle in the riflescope, and without disturbing magnification settings if a variable-power optical system is used.

CROSS-REFERENCE TO RELATED APPLICATION

This application is a continuation-in-part of our co-pending application Ser. No. 335,728, filed Jan. 6, 1964, now abandoned.

BACKGROUND OF THE INVENTION

It is often necessary to adjust a telescope sight on a firearm to correct for range, variations in ammunition, and for wind conditions. In many conventional telescope sights, corrections are made by moving the sight reticle laterally, i.e., up or down, right or left, with respect to the axis of the scope. As a result of such an adjustment, the reticle is often located off the center of the field of view of the scope to such a degree as to produce a psychological adverse effect on shooting.

This invention provides an improved telescope sight in which adjustments can be made for range, windage, and the like, without shifting the reticle from the longitudinal axis of the telescope sight. The centered reticle is an aid to accuracy because it accommodates the natural tendency of the eye to center the reticle and target image in the bright circle of the sight. Furthermore, a full one-half of the visual field of the sight on each side of a centered vertical reticle is made available for leading a moving target.

Briefly, the invention includes an elongated sight barrel with an ocular lens mounted in one end of the barrel. A reticle is mounted in the barrel. An erector lens is also mounted in the barrel, and spaced from the ocular lens so that the erector lens and ocular lens define an optical axis through the barrel. An objective lens system having a focal plane ahead of the erector lens is disposed on the optical axis. Means are provided for mounting at least one refracting element in the objective lens system to be movable with respect to the optical axis whereby a target image in the focal plane is shifted transversely to the optical axis.

The target image shift in the objective focal plane results in a corresponding shift in the target image seen by the shooter in the ocular-lens focal plane. That is, the image seen by the shooter is shifted transversely with respect to the optical axis and the reticle. To correct for range, an objective lens element is moved up or down to cause the target image to shift vertically, and without shifting the reticle from the center of the field of view through the telescope sight. To correct for windage, an objective lens element is moved to the left or right, causing the target to shift horizontally without shifting the reticle from the center of field of view. These corrections can also be made by tilting one or more objective lens elements.

The improvement of this invention is particularly useful in a telescope sight of variable power in which one or more erector lenses are shifted longitudinally along the optical axis of the sight barrel to change the magnification power of the sight. The objective lens system is not shifted longitudinally to change the power of the sight, and a relatively simple mounting can be used to shift an objective lens up and down, or left and right. Conversely, since the erector lenses do not shift laterally with respect to the optical axis, it is relatively simple to make them adjustable longitudinally to produce variable magnification power. Another advantage of shifting an objective lens instead of the erector lens is the elemination of error when power is changed by moving the erector lens or lenses longitudinally along the optical axis.

When the invention is used in a variable-power telescope sight, the reticle is preferably mounted in the focal plane of the ocular lens and behind the erector lens so that as the power of the scope is increased, the size of the reticle remains constant. This causes the reticle to subtend a smaller angle at the target at higher powers of magnification, and improves accuracy in shooting.

In one form of the invention, means are provided for shifting at least one element of the objective lens system transversely with respect to the optical axis. In another configuration, the desired target-image shift is accomplished by tilting one or more objective-lens elements about a pivot point. These adjustments can be accomplished by transverse screws, cam rings, threaded rings or other means in engagement with the sight barrel and lens mount.

These and other aspects of the invention will be more fully understood from the following detailed description and the accompanying drawings, in which:

FIG. 1 is a fragmentary elevation, partly broken away, of the presently preferred embodiment of the invention;

FIG. 2 is a view taken on line 2—2 of FIG. 1;

FIG. 3 is a schematic diagram of the optical system of the sight shown in FIG. 1, showing how the power of the sight is varied;

FIG. 4 is a fragmentary elevation, partly broken away, of a first alternate embodiment of the invention;

FIG. 5 is a fragmentary elevation, partly broken away, of a second alternate embodiment of the invention;

FIG. 6 is a view taken on line 6—6 of FIG. 5;

FIG. 7 is a fragmentary sectional elevation of a third alternate embodiment of the invention;

FIG. 8 is a view taken on line 8—8 of FIG. 7;

FIG. 9 is a fragmentary sectional elevation of a fourth alternate embodiment of the invention; and FIG. 10 is a view taken on line 10—10 of FIG. 9.

Referring to FIGS. 1 and 2, a telescope sight 10 includes an elongated hollow cylindrical sight barrel 12 with an ocular lens 14 secured in an eyepiece 15 at the eyepiece end (right end as viewed in FIG. 1) of the sight barrel. A reticle 16, which may be of conventional type, is mounted in the sight barrel in the focal plane of the ocular lens. First and second erector lenses 18, 20, respectively are mounted in the barrel forward of the reticle to define an optical axis 22 which passes through the center of the barrel and the center of the ocular and erector lenses. The erector lenses are movable longitudinally along the optical axis at different rates, as described in detail with respect to FIG. 3, to change the power of the scope while maintaining proper focus of an image.

An elongated cylindrical and hollow pivot tube 24 has an annular elastic gasket 26 secured around its exterior adjacent its right (as viewed in FIG. 1) end. The right end of the pivot tube and gasket are secured in the forward or left end of the sight barrel by a lock ring 28 threaded into the left end of the barrel to hold the gasket against an annular internal shoulder 30 within the barrel. The gasket seals the pivot tube to the barrel and serves as a pivot point for the pivot tube with respect to the front end of the sight barrel.

An elevation adjustment screw 32 is threaded through the top of the barrel so that its lower end fits in an annular recess 33 around the right end of the pivot tube. A first longitudinally extending elongated leaf spring 34 on the bottom of the pivot tube is secured at its left (as viewed in FIG. 1) end to a retainer ring 35 secured around the pivot tube just to the rear (right) of the pivot gasket. The spring is bowed downwardly in its center portion so that the intermediate portion of the spring bears against the bottom of the inside of the sight barrel, and urges the tube up against the elevation adjustment screw 32.

A windage adjustment screw 36 is threaded horizontally through one side of the sight barrel to fit in annular groove 33 and against one side of the rear end of the pivot tube. A second longitudinally extending elongated leaf spring 38 is mounted on the retainer ring 35 on the opposite side of the pivot tube from the windage adjustment screw. The second leaf spring is identical with the first, and urges the right end of the pivot tube in a horizontal direction against the windage adjustment screw.

An objective lens system 39 is mounted in the forward end of the pivot tube to be on the optical axis of the sight. An objective lens system is herein defined as including every refracting element from the front of the telescope sight back to the objective focal plane. The system may have only one refracting element, or may comprise several cemented or air-spaced refracting elements.

A mounting bracket 40 (shown only in phantom line in FIG. 2) is secured to the bottom of the sight barrel for mounting the sight on the gun barrel 41 (shown only in phantom line in FIG. 2).

As shown schematically in FIG. 3, the first and second erector lenses 18, 20 respectively are connected through a linkage 43, which may be of a conventional type to be movable longitudinally along the optical axis 22 of the sight. The linkage is so arranged that the first and second erector lenses can be moved toward and away from the objective lens, and relative to each other, as is done in conventional "zoom" lenses. The distance between the erector lenses and the objective lens determines the power of the scope.

Varying the distance between the first erector lens and the second erector lens maintains good focus of the scope as power is changed. Preferably, the light from the second erector lens should focus on the reticle in the focal plane of the ocular lens. The linkage is also arranged so that in increasing the power of the scope by moving the first erector lens toward the objective lens, the second erector lens is moved a greater distance toward the objective lens to reduce the spacing between the two erector lenses and keep the focus constant on the reticle. Conversely, on decreasing the power of the scope, the second erector lens moves away from the objective lens at a faster rate than does the first erector lens.

To adjust the telescope sight for range and windage, the elevation and windage adjustment screws are turned either in or out until a bullet fired by the gun strikes the same impact point on the target indicated by the reticle. When either screw is moved in or out, the inner end of the pivot tube shifts laterally with respect to the optical axis of the telescope sight, and produces a corresponding shift in the objective lens, which causes the image to shift with respect to the optical axis of the telescope sight without shifting the position of the reticle in the field of view. Thus, the image of the reticle remains fixed in the center of the field of view, while adjustments are made for either windage or elevaton. Moreover, as the power of the scope is changed, the size of the reticle remains constant because it is in the focal plane of the ocular lens and behind the erector lens. Thus, as the power of the scope is increased to sight on the target at a relatively large distance, the size of the reticle remains constant, even though the apparent size of the target increases. The reticle thus subtends a smaller angle at the target, increasing sighting accuracy.

In the alternate embodiment shown in FIG. 4, the sight barrel includes a cylindrical skirt 50 which extends forward of the left (as viewed in FIG. 4) end of the pivot tube, and a pane of plate glass 52 is sealed in the skirt forward of objective lens element 39 and pivot tube 24 to provide a weatherproof seal for the pivot tube within the sight barrel. The remaining elements of the sight shown in FIG. 4 are substantially identical with those described in FIG. 1, and therefore the description is not repeated in detail for the sake of brevity.

In the embodiment shown in FIGS. 5 and 6 an adapter sleeve 60 is threaded into the left end of the sight barrel 12. The adapter sleeve includes an annular outwardly extending flange 62 around its intermediate portion. The exterior portion of the adapter sleeve to the left (as viewed in FIG. 5) fits inside the right end of an objective-lens mounting tube 64 which is stepped down to form a forwardly facing internal annular shoulder 66. The right end 67 of the mounting tube bears against a first annular washer 68 of a suitable flexible material, say, nylon, which in turn bears against the forward face of flange 62. A pair of lock rings 70 threaded on the exterior of the left end of the adapter sleeve bear against a second nylon washer 72 and against the forwardly facing internal shoulder 66 of the mounting tube to hold the mounting tube in a snug but slip fit against the flange 62.

A first annular cam ring 74 is disposed around the right end of the mounting tube between the first nylon washer 68 and an annular spacer washer 76 secured by a setscrew 78 to the exterior of the mounting tube. An eccentric annular cam surface 80 is formed on the interior of the first cam ring to bear against the outer end of a first pair of cam pins 81, constructed of material such as nylon, which make a slip fit through openings 82 on opposite sides of the mounting tube. The inner ends of the first pair of cam pins bear against opposite sides of the adapter sleeve. A third annular nylon washer 84 is disposed betweeen the rear face of the spacer washer and the forward edge of the first cam ring. Thus, as the first cam ring is rotated about the optical axis, the first cam pins bearing on the eccentric cam surface force the cam ring and therefore the mounting tube to shift from side to side with respect to the sight barrel and optical axis.

A second annular cam ring 86 is disposed around the mounting tube between a fourth annular nylon washer 88 disposed against the forward face of the spacer washer and between a fifth annular nylon washer 89 is disposed against a rearwardly facing annular external shoulder 90 on the mounting tube. An internal annular eccentric cam surface 92 on the second cam ring bears against a second pair of cam pins 94 which each make a sliding fit through a respective vertical bore 96 in the top and bottom of the mounting tube to bear against opposite sides of the adapter sleeve. Thus, as the second cam ring is rotated about the optical axis, the cam pins force the cam ring and mounting tube to shift up or down with respect to the sight barrel and optical axis.

The objective lens 39 is mounted in the forward end of the mounting tube. The remaining elements of the sight are substantially identical with those described with respect to FIGS. 1 and 2, and therefore a detailed description is not repeated.

It will be noted from the foregoing description of the sight shown in FIGS. 5 and 6 that the adapter-sleeve extension of the sight barrel fits inside the mounting tube, and that the cam rings fit coaxially around the mounting tube where the tube is coextensive with the adapter sleeve. The mounting tube and adapter sleeve are slightly spaced apart so that they can be laterally shifted with respect to each other by the cam pins as the cam rings are rotated. Of course, the mounting tube could be arranged to fit inside the sight barrel instead of outside it, and the cam pins could be disposed through bores in the sight barrel to bear against the mounting tube to produce the same relative shifting between the tube and the barrel.

For example, the embodiment shown in FIGS. 7 and 8 incorporates an air-spaced, multielement objective-lens system. A positive objective element 101 is sealed in the forward end of an adapter sleeve 103 which is threaded into the forward end of sight barrel 12. A negative objective element 105 is secured in a mounting tube or ring 106 disposed within the sight barrel between a retaining ring 108 threaded into the sight barrel and an annular shoulder 109 at the rear of the adapter sleeve. Retaining ring 108 is adjusted so mounting ring 106 slides freely on the retaining ring and annular shoulder in a direction perpendicular to the longitudinal axis of the sight.

A pair of nylon cam pins 110 are secured to opposite sides of the outside of the mounting ring, and make a slip fit through openings 111 in the top and bottom of the sight barrel. A first annular cam ring 113 is coaxially disposed around the sight barrel, and has an eccentric annular cam surface 114 which bears against the outer ends of cam pins 110.

A second pair of cam pins 116 are spaced 90 degrees from cam pins 110 and are secured to opposite sides of the outside of the mounting ring, making a slip fit through openings 117 in the sides of the sight barrel. A second annular cam ring 119 is coaxially disposed around the sight barrel just behind the first cam ring, and has an eccentric annular cam surface 120 which bears against the outer ends of cam pins 116.

The two cam rings are sandwiched between a rearward-facing annular shoulder 122 on the adapter ring, and an annular retaining ring 124 which is secured to the sight barrel by a set screw 125. Three annular nylon washers 127 separate shoulder 122, cam rings 113 and 119, and retaining ring 124 to insure relatively free rotational movement of the cam rings.

When cam ring 119 is rotated, cam pins 116 are moved, forcing the lens mounting ring and the associated negative objective element to move horizontally, therey providing a windage adjustment for the sight. This is most easily seen in FIG. 8, where the amount of displacement of the lens mounting ring has been exaggerated for clarity. The elevation setting is made by rotating cam ring 113 which moves the lens mounting ring up or down in the manner just described. An adjustment range of about ±0.030 inch will generally provide ample windage and elevation compensation.

Some objective lens systems have several air-spaced elements behind a front positive element. One cam ring can be used on each of two such elements, one element being movable to provide a windage adjustment, and the second element being movable to provide an elevation adjustment. Such a lens arrangement is also well suited to the alternative embodiment of the invention shown in FIGS. 9 and 10 in which the elements are pivoted or tilted rather than shifted transversely with respect to the optical axis to provide windage and elevation adjustments.

In this embodiment, the objective lens system includes, for example, a positive element 130 and two air-spaced negative elements 132 and 133. The positive element is sealed in the forward end of an adapter ring 135 which is threaded into sight barrel 12. The negative elements are secured by cementing or other means into respective mounting rings 137 and 138 which are disposed within the forward end of the sight barrel.

Mounting ring 137 has a groove 140 in the outer wall of the bottom of the ring, the length of the groove being transverse to the longitudinal axis of the sight barrel. As best seen in FIG. 9, the cross section of the groove is in the form of an arc of a circle. A similar groove 142 is cut in the inner wall of the bottom of the sight barrel. A cylindrical pivot pin 144 is disposed in the grooves, and mounting ring 137 is free to rock or pivot about the horizontal axis of the pivot pin.

Secured to the outer wall of mounting ring 137 opposite groove 140 is a pointed pin 146 which makes a slip fit through slot 147 in the sight barrel. The point of this pin engages threads 149 cut around the inner periphery of an annular adjustment ring 150 which is coaxially disposed around the sight barrel.

As best seen in FIG. 10, a similar arrangement is provided for mounting ring 138, including mounting-ring groove 153, sight-barrel groove 154, pivot pin 155, pointed pin 156, slot 157, annular adjustment ring 158 and threads 159. This arrangement is identical to the one just described, except the grooves, pivot pin, slot and pointed pin are located on the sides of mounting ring 138 and the sight barrel. Thus mounting ring 138 rocks or pivots about the vertical axis of pivot pin 155.

Adjustment rings 150 and 158 are restrained from longitudinal movement along the sight barrel by being sandwiched between two retaining rings 162 which are secured in place by setscrews 163. Three annular nylon washers 164 separate the adjustment and retaining rings to insure relatively free rotational movement of the adjustment rings.

When adjustment ring 150 is rotated, pointed pin 146 is moved forward and backward, tilting negative element 132 to shift the position of a target image in the objective focal plane whereby an elevation adjustment is provided for the sight. Similarly, rotation of adjustment ring 158 tilts negative element 133 whereby a windage adjustment is provided for the sight. Threads 149 and 159 should be quite fine, as a tilt range of about ±½ degree is generally adequate to provide the desired range of adjustment.

There have been described several alternative means for shifting or tilting one or more elements in an objective lens system to provide windage and elevation adjustments for a centered-reticle telescope sight. It is to be understood that the scope of the appended claims are not limited to these specific means, and that the invention extends to any means for tilting or shifting one or more refracting elements forward of the objective focal plane in order to provide the desired sight corrections.

What is claimed is:

1. A telescopic sight comprising a sight barrel member, mounting means secured to the sight barrel member for mounting the sight on a rifle, an ocular lens mounted in the barrel member, a reticle mounted in the barrel member, an erector lens mounted in the barrel member and spaced from the ocular lens, the erector and ocular lenses defining an optical axis through the barrel member, a mounting tube member, means mounting the tube member so that at least a portion of the tube and barrel members are coextensive and spaced apart, an objective lens disposed in the mounting tube member and on the optical axis, a pair of rotatable cam rings disposed around said coextensive portions of the tube and barrel members, each ring having a separate inwardly facing cam surface, first cam means extending transverse to the optical axis and engaging one of the cam surfaces and one of the members, and second cam means extending transverse to the first cam means and the optical axis and engaging the other one of the cam surfaces and the said one of the members so the mounting tube member moves transversely with respect to the optical axis as the cam rings are rotated to provide windage and elevation adjustments for the sight.

2. A telescopic sight comprising a sight barrel, mounting means secured to the sight barrel for mounting the sight on a rifle, an ocular lens mounted in the barrel, a reticle mounted in the barrel, an erector lens mounted in the barrel and spaced from the ocular lens, the erector and ocular lenses defining an optical axis through the barrel, a multielement objective lens system having at least two air-spaced refracting elements disposed on the optical axis, the objective lens system having a focal plane on the optical axis between said system and the erector lens, first means for moving one of the refracting elements to shift a target image in the focal plane vertically with respect to the optical axis to provide an elevation adjustment for the sight, and second means for moving a second of the refracting elements to shift a target image in the focal plane horizontally with respect to the optical axis to provide a windage adjustment for the sight, said first and second means each comprising an internally threaded ring coaxially disposed around the sight barrel, a member secured to said respective refracting element, the member extending through an opening in the sight barrel to engage the ring threads, and pivot means in engagement with the element and the barrel, whereby rotation of the ring moves the member and tilts the respective refracting element about the pivot point.

References Cited

UNITED STATES PATENTS

| | | | |
|---|---|---|---|
| 1,207,418 | 12/1916 | Lazarte. | |
| 2,359,702 | 10/1944 | Wittig | 350—252 |
| 2,367,567 | 1/1945 | Darby. | |
| 2,891,445 | 6/1959 | Staubach | 350—10 X |
| 2,909,964 | 10/1959 | Keuffel et al. | 350—10 X |
| 2,949,816 | 8/1960 | Weaver | 350—10 X |
| 2,960,912 | 11/1960 | Baker | 350—10 X |
| 3,058,391 | 10/1962 | Leupold | 350—10 |
| 3,161,716 | 12/1964 | Burris et al. | 350—44 X |
| 3,297,389 | 1/1967 | Gibson | 350—10 |
| 3,359,849 | 12/1967 | Friedman | 350—285 X |

FOREIGN PATENTS

| | | |
|---|---|---|
| 219,299 | 1/1962 | Austria. |
| 47,506 | 4/1911 | Austria. |

DAVID SCHONBERG, Primary Examiner

T. H. KOSMER, Assistant Examiner

U.S. Cl. X.R.

350—25, 48, 54